Aug. 3, 1965 F. LENTZE 3,198,951
PHOTOELECTRIC CONTROL DEVICE FOR A
FLAW DETECTOR FOR MOVING WEBS
Filed May 31, 1962

Inventor:
FELIX LENTZE
By Toulmin & Toulmin
Attorneys

United States Patent Office 3,198,951

Patented Aug. 3, 1965

3,198,951

PHOTOELECTRIC CONTROL DEVICE FOR A FLAW DETECTOR FOR MOVING WEBS

Felix Lentze, Darmstadt, Germany, assignor to Licentia Patent-Verwaltungs-G.m.b.H., Frankfurt am Main, Germany Filed May 31, 1962, Ser. No. 198,911
Claims priority, application Germany, May 31, 1961, L 39,107
5 Claims. (Cl. 250—219)

Figure 1:
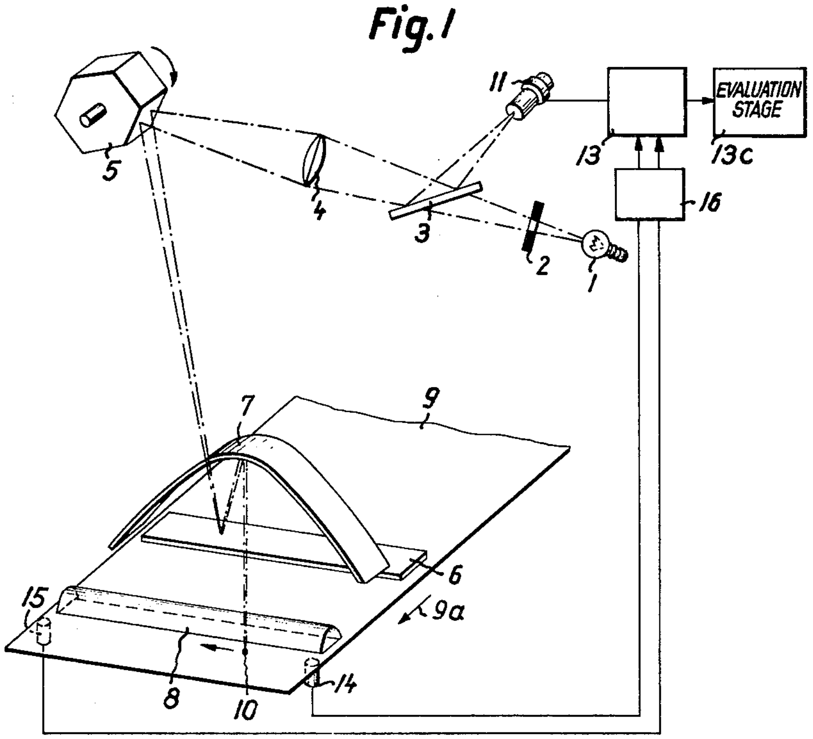

The present invention relates to a flaw detector for moving webs and the like, more particularly, to a control arrangement for such a flaw detector which eliminates the effect of any signals produced by scanning of the edges of the moving web.

Various forms of photoelectric surface scanning devices have been proposed for inspecting moving webs or sheets of material such as paper, textiles, plastics, and the like. These devices inspect the webs for any evidence of non-uniformity in the surface thereof such as any flaws, cracks or tears, holes, the inclusion of foreign bodies in the web and other forms of defects.

One form of such an inspecting apparatus comprises the use of a revolving or pivoting mirror to move the light spot line by line over the surface of the web to be tested and reflected from the web unto at least one photoelectric detector. Connected in series with the photoelectric detector is an evaluation installation essentially comprising at least one amplifier having differentiating stages and at least one flaw detector signal evaluating stage. When the light spot encounters any surface defects in the web, the reflected light will vary to produce a flaw detecting signal in the photoelectric detector. This signal is then amplified and transmitted to the flaw detector signal evaluating stage which determines according to established standards whether a particular defect is such so as to cause the web material to be rejected. An output signal from the evaluating stage can then be used to control various forms of apparatus such as scissors, cutters or other structures for removing bad portions of the material from the web in which the flaw has been detected.

During the scanning operation, the web is maintained in a flat and planar position with particular efforts being made to eliminate any rippling movements or wrinkles therein. This can be accomplished by passing the web over a rigid supporting surface, or by the use of suction boxes or suction drums. When, during the scanning of the web, the light spot is projected onto the web support either before or after passing over the web, variations are produced in the quantity of the reflected light which may be interpreted by the scanning apparatus as flaws.

In order to eliminate such simulated flaw signals, it has been considered to block the transmission of flaw signals into the evaluation device or the series-connected circuits after the light spot has scanned one line across the web and to unblock the transmisison of these signals when the light spot begins the scanning of the line across the web. Thus, there is no effect on the evaluating stage from signals derived from the transition of the light spot from the web to the support or vice versa.

The above desired result might be achieved by providing a blocking effect directly at the input of the amplifier. However, the blocking effect at the input of the amplifier is not satisfactory and it is more suitable to block at least one subsequent stage.

Although the above proposed arrangement will suppress flaw signals caused by the transition of the light spot from the web to the support, these signals do not rapidly diminish. Since the differentiating stages are used to detect flaws which produce only slight variation in the reflected light, they do not differentiate very strongly. The coupling members in the differentiating stages possess relatively large time constants so that low frequencies can also be transmitted. As a result, when the light spot begins the scanning of a new line on the web only a slowly fading signal pulse is generated during the transition of the light spot from the support onto the web. Further, after the light spot has just entered on the web surface, flaws occurring adjacent the edge of the web cannot be detected since the amplifying stages positioned in front of the blocking stage are still blocked by the transition signal pulses.

It is therefore the principle object of the present invention to provide a novel and improved flaw detector arrangement for moving webs wherein flaws detector signals are not effected by the passage of a scanning light spot over the edges of the web.

It is another object of the present invention to provide a control device for a flaw detector arrangement including a differential stage wherein the differentiation is greater when the scanning light spot is not within the web than when the light spot is scanning over the web.

The present invention essentially comprises a photoelectric surface scanning arrangement which produces a light spot which in turn is passed line by line over the surface of a moving web to be inspected for defects. The light spot is reflected onto at least one photoelectric detector which is connected in series with at least one amplifier having differentiating stages and with an evaluating circuit of the flaw detector signals. The evaluating circuit includes a flaw detector signal evaluating stage, having a circuit therein to block the evaluating circuit or the series connected arrangements with respect to the transmission of flaw signals after the light spot has scanned one line across the moving web. The evaluating installation is then unblocked when the light spot begins the scanning of a new line across the web. The differentiation stage is also connected to the control signal generators defining the scanning limits of the light spot when the differentiation is greater when the evaluating circuit is blocked than when the surface scanning arrangement is operating and the light spot is passing over the web.

As a result of this arrangement the signal pulses produced by the transition of the light spot from the web to the support and vice versa diminish very quickly. This arrangement makes it possible to scan virtually the entire width of the moving web within which the differentiation for flaws detected therein varies only gradually and is not as great as when the light spot is outwardly of the edges of the web.

The coupling condenser which has been charged through a control signal emitted during the transition of the light spot from the web of the supporting surface or vice versa is discharged prior to the unlocking of the evaluation arrangement when the light spot begins the scanning of a new line because of the strong differentiation present while the arrangement is blocked.

In one embodiment of the invention the blocking occurs in the final stage and the change of connections for varying the differentiation occurs in previous stages.

According to the teachings of this invention it is possible to obtain such a strong differentiation in the previous stages that it is practically the same as a blocking attained by short-circuiting the grid of an amplifier tube. In such an arrangement, however, care must be taken to avoid variation of the plate current so as to prevent the emission of a flaw signal. As a result it is possible to dispense with a particular blocking arrangement in the final stage.

Figure 2:
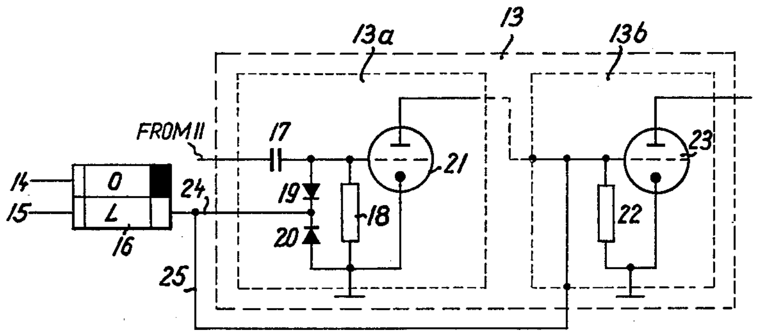

Other objects and advantages of the present invention will be apparent upon reference to the accompanying description when taken in conjunction with the following drawings wherein;

FIGURE 1 shows schematically a photoelectric surface scanning arrangement, using photoelectric detectors to limit the scanning of a light spot on a moving web; and FIGURE 2 shows an electrical circuit diagram including a switching arrangement for blocking the flaw signals in the final stage and for reversing the differentiating stage positioned in front of the fiinal stage, and including an RC-circuit.

The photoelectric surface scanning arrangement as shown in FIGURE 1, for producing a light spot across a web comprises a light source 1 which illuminates a slit 2 and the light emerging from the slit 2 passes through a partially reflecting translucent member 3 and an optical system 4 onto a rotating multi-surface mirror drum 5. The light is reflected from that multi-surface reflector 5 onto a plane mirror 6 and a parabolic reflector 7 and then through a cylindrical lens 8 onto a moving web 9 to form a light spot 10. The rotating multi-surface reflector drum 5 causes a periodic movement of the light spot 10 transversely across the moving web 9, in a direction perpendicular to the direction of movement of the web. The optical elements of this arrangement are so selected so that the light spot 10 impinges at substantially the same intensity and sharpenss of image on all points of the web surface including areas adjacent the edges of the web.

The light from the light spot 10 is reflected back along substantially the same path as described above and is reflected by the partially reflecting properties of the translucent member 3 onto a photoelectric detector 11 which emits a flaw detector signal. The flaw detector signal is transmitted to an evaluation circuit comprising a stage 13 which conventionally consists of several amplifying stages or flaw detector signal evaluating stages. The output signal of stage 13 can, in turn, control scissors, cutters, or other instruments for removing portions of the web wherein the flaws located therein cause that portion of the web to be rejected. In order to control such apparatus the output signal of stage 13 must be delayed in proportion to the distance between the scanning light spot 10 and the apparatus being controlled. In addition the speed at which the web is moving must also be taken into consideration.

Two photoelectric detectors 14 and 15 are positioned adjacent the edges of the web to function as control signal generators. The photoelectric detectors can be positioned beneath or above the web or at the same height as the cylindrical lens 8. They are mounted so as to be adjustable and are in the vicinity of the edges of the web.

The control signal generator 15 is actuated after the light spot has scanned the web and moves over the edge of the web onto the web support which latter is not shown in the drawings. The control signal generator 14 is actuated when the light spot 10 begins to scan another line across the web 9. The disabling signal emitted by the control signal generator 15 exerts a blocking action on the evaluation circuit 13 and its series-connected circuits through a transfer member 16. This blocking action is terminated by the enabling signal emitted from the other control signal generator 14.

Proceeding next to FIGURE 2 there is illustrated an embodiment of the evaluation circuit 13. In this embodiment a differentiating stage is actuated simultaneously with the blocking of the transfer of the flaw detector signals in order to effect a stronger differentiation.

The evaluation circuit 13 comprises a differentiating stage **13*a*, a gating stage 13*b*, and an evaluation stage 13*c* as shown in FIGURE 1. Amplifiers may be positioned ahead of stage 13*a* and/or ahead of stage 13*b*. For the purpose of describing this invention the stage 13*b* is considered as the final stage and the stage 13*a*** as one of the previous stages. Only the active components are illustrated in the drawings.

The stages **13*a* and 13*b* comprise the triodes 21 and 23 respectively to which are connected grid resistances 18 and 22. The grid resistance 18 together with a coupling capacitor 17 acts as a differentiating stage. An electronic switch is formed by diodes 19 and 20 which are positioned in parallel with respect to the grid resistance 18 and which are connected to the transfer member 16 through 24**. Other forms of an electronic switch can be used including a diode bridge switch.

The grid of the diode 23 is also connected to the transfer member 16 through lead 25.

The transfer member 16 comprises a bistable flip-flop circuit with the inputs thereof being respectively connected to the outputs of the control signal generators 14 and 15. The output signal of the flip-flop 16 blocks the tube 21 or reverses the stage **13*a*** to obtain stronger differentiation.

The blocking of the transfer of the flaw detector signals is preferably achieved in the final stage of the amplifying arrangement. Instead of directly blocking the final stage by the output signal of the flip-flop 16, an electronic switch can be provided in the grid circuit or the cathode circuit of tube 23 which circuit can be opened by the output signal of the flip-flop 16 to thereby prevent the transfer of flaw detector signals.

With respect to stage **13*a* the output signal of flip-flop 16 effects the closing of the electronic switch 19, 20 and accordingly the diminishing of the effective time constant of the RC-circuit 17, 18** to obtain a stronger differentiation of the flaw detector signal.

An accumulator element which is reversible by means of static signals can also be employed as transfer member 16. A plurality of impulse forming stages can then be connected in series to the accumulator in order to prolong the signal.

The operation of the above described arrangement is as follows: While the light spot 10 is positioned on the web 9 between the control signal generators 14 and 15, the bistable flip-flop 16 is in its operating position with an "L" signal at its black output. Accordingly, in this position of the light spot 10 the final stage **13*b* is not blocked and electronic switch 19, 20 is open. The differentiating stage 13*a* is so arranged that during this positioning of the light spot 10 flaws will be detected in the web 9** wherein the reflected light varies only slightly.

When the scanning light spot 10 impinges on the control signal generator 15, the bistable flip-flop 16 is reversed by the emitted signal. Thus, at the white output of flip-flop 16 there now appears an "L" signal which reverses the differentiating stage 17, 18 in order to obtain a stronger differentiation and blocks the final stage **13*b*. As a result the flaw detector signal produced by the moving of the light spot 10 over the edge of the web 9** will not have any effect.

When the light spot 10 impinges upon the control signal generator 14 during the beginning of a subsequent line of scanning across the web 9 the flip-flop 16 is reversed by the control signal emitted therefrom. Thus, the "L" signal at the white output disappears and the initial condition of the flip-flop is re-established. Since the state of strong differentiation exists prior to the impingement of the light spot upon the control signal generator 14, the flaw detector signal generated by the impingement of the light spot on the right edge of the web (taken in the direction of movement of the web 9, as indicated by the arrow **9*a*) has died out when the light spot 10 impinges on the control signal generator 14. Energization of the control signal generator 14** by the light spot actuates the arrangement into its operating condition. The stronger the differentiation while the arrangement is blocked, the closer the control signal generators can be positioned to the edges of the web. The practical advantage of this positioning is that a greater width of the web can be scanned.

The control signal generators 14 and 15 may comprise photoelectric diodes, photoelectric cells, photoelectric resistances, or other forms of photosensitive elements. When photosensitive transistors are thus used, the transistors can function as active switching elements of the flip-flop 16. With photoelectric diodes or the like, mirrors may be provided adjacent the edges of the web so as to reflect the light spot onto a photoelectric cell whose response period is shorter than that of a photoelectric diode.

In the embodiment of the invention as shown in FIGURE 1, the surface scanning arrangement utilizes the principle of auto-collimation with a physical light splitting wherein the reflected light beam is deflected by a semi-transparent mirror 3. The present invention, however, is not limited to this surface scanning arrangement or to any other surface scanning device. The scanning arrangement may also function as a geometrical light splitter wherein an illuminated slit serving as a source of light, is projected by an optical system as a point onto the web. One half of the cylindrical lens is limited by the central optical plane of the lens so that only the light reflected from the light point passes through the other half of the cylindrical lens to indicate the surface condition of the web. The scanning light beam may impinge either perpendicularly or at a predetermined angle onto the web surface.

The scanning arrangement can also be operated with a plurality of light channels wherein one third of light slit source is illuminated and the light impinges symmetrically with respect to the central axis of the cylindrical lens. The reflected light is then transmitted through the other two parts of the lens in two light channels onto the two other thirds of the slit and then projecting these two thirds onto a single flaw detector signal generator.

Instead of utilizing a scanning arrangement employing the principle of auto-collimation, one can use a scanning device based on the principle of reflection. A light beam impinges at a predetermined angle onto the web and is then reflected onto photoelectric detectors, positioned at the angle of reflection. When transparent webs are being inspected, photoelectric detectors may be mounted below the web.

The flaws in a web can be evaluated according to their contrast by employing an amplifier, such as a pulse clipper. It is also possible to evaluate the magnitude of flaws in the scanning direction by the duration of the flaw detector signals or in the direction of movement of the web, by counting the flaw detector signals emitted for a single defect. The flaw detector signal evaluation stage can also be provided with a counting stage to count the number of flaw detector signals emitted and if desired to give a sorting signal when a predetermined number of flaw detector signals is recorded. The counting stage may also give a signal if no flaw detector signals are emitted after a predetermined number of scannings have been made on the web. The counting stage can also be employed to indicate the length of a defect running in the direction of movement of the web.

The present invention can also be employed to simultaneously scan the top and bottom surfaces of the web or to scan the web in two intersecting directions in order to detect surface irregularities therein.

While the above described embodiment utilizes two photoelectric control signal generators to indicate the width of the web to be scanned, it is pointed out that the width of the web can also be measured and indicated by other values. For example, a saw-tooth generator can replace one of the photoelectric control signal generators and be pulsed by the control signal of the other photoelectric control signal generator together with a signal responsive to a predetermined voltage and generating the control signal. The rise in potential of the saw-tooth generator is so selected that the trigger signal is actuated at the same moment that the light spot begins to scan one line or completes the scanning of a line according to the arrangement of the photoelectric control signal generator.

In addition to the above-mentioned modifications it is also possible to carry out this invention utilizing a portion of a light beam which is beyond the range of the main light beam forming the light spot.

It will be understood that this invention is susceptible to modification in order to adapt it to different usages and conditions and, accordingly, it is desired to comprehend such modifications within this invention as may fall within the scope of the appended claims.

What is claimed is:

1. In a flaw detector for moving webs, having means for directing a light beam toward a surface of a moving web including means for converging the light beam to a light spot on the web and for moving the spot perpendicularly to the direction of movement of the web, further having photoelectric means positioned to be responsive to the reflection of said light spot by the web and producing a flaw detector signal, further having a control signal generator responsive to the passage of said light spot over the edges of the web and producing an enabling signal when said spot enters and a disabling signal when it leaves the web, the combination comprising: circuit means including a variable differentiating stage and a gate connected to said photoelectric means so as to be responsive to said flaw detector signal, circuit means for feeding said enabling and disabling signals to said gate for gating said flaw detector signal, switch means connected to said differentiating stage for controlling the variation thereof, and circuit means for feeding said enabling and disabling signals to said switch means so that the time constant of said differentiating stage is increased after said enabling signal and decreased after said disabling signal.

2. In a flaw detector for moving webs, having means for directing a light beam toward a surface of a moving web including means for converging the light beam to a light spot on the web and for moving the spot perpendicularly to the direction of movement of the web, further having photoelectric means positioned to be responsive to the reflection of said light spot by the web and producing a flow detector signal, further having a control signal generator responsive to the passage of said light spot over the edges of the web and producing an enabling signal when said spot enters and a disabling signal when it leaves the web, the combination comprising: circuit means including a differentiating capacitor-resistor network with a variable resistor and further including a gate, said circuit means being connected to said photoelectric means for gating and differentiating said flaw detector signal, circuit means for feeding said enabling and disabling signals to said gate for gating said flaw detector signal, and switching means for controlling said variable resistor and being connected to said control signal generator so that the resistivity of said network is increased after said enabling signal and decreased after said disabling signal.

3. In a flaw detector for moving webs, having means for directing a light beam toward a surface of a moving web including means for converging the light beam to a light spot on the web and for moving the spot perpendicularly to the direction of movement of the web, further having photoelectric means positioned to be responsive to the reflection of said light spot by the web and producing a flaw detector signal, further having a control signal generator responsive to the passage of said light spot over the edges of the web and producing an enabling signal when said spot enters and a disabling signal when it leaves the web, the combination comprising: a variable differentiating stage including a switch for varying the differentiation thereof, said stage being connected so as to be responsive to said flaw detector signal, a gate with input, gating and output terminals, said input terminal being connected to the output of said differentiating stage, circuit means for feeding said enabling and said disabling signals as gating open and blocking signals to said gating terminal, and circuit means for feeding said enabling and said disabling signals to said switch for varying said differentiation.

4. In a flaw detector for moving webs, having means for directing a light beam toward a surface of a moving web including means for converging the light beam to a light spot on the web and for moving the spot perpendicularly to the direction of movement of the web, further having photoelectric means positioned to be responsive to the reflection of said light spot by the web and producing a flow detector signal, further having a control signal generator responsive to the passage of said light spot over the edges of the web and producing a first and second control signal when said light spot enters and leaves respectively the web, the combination comprising: circuit means including a variable differentiating stage and a gate connected to said photoelectric means so as to be responsive to said flaw detector signal, a bistable flip-flop with two inputs connected to said generator and individually responsive to said first and said second signals, an electronic switch connected to said flip-flop for activation and deactivation thereby and governing the variation of said differentiating stage, and means for connecting said flip-flop to said gate for governing and gating the passage of flaw detector signals therethrough.

5. In a flaw detector for moving webs, having means for directing a light beam toward a surface of a moving web including means for converging the light beam to a light spot on the web and for moving the spot perpendicularly to the direction of movement of the web, further having photoelectric means positioned to be responsive to the reflection of said light spot by the web and producing a flaw detector signal, further having a control signal generator responsive to the passage of said light spot over the edges of the web and producing an enabling signal when said spot enters and a disabling signal when it leaves the web, the combination comprising: circuit means including a variable differentiating stage and a gate connected to said photoelectric means so as to be responsive to said flaw detector signal, circuit means connected to said gate for gating said flaw detector signal in response to said enabling and disabling signals, and circuit means connected to said variable differentiating stage for producing individual variations thereof in response to said enabling and said disabling signals.

References Cited by the Examiner

UNITED STATES PATENTS

| | | | |
|---|---|---|---|
| 2,393,631 | 1/46 | Harrison et al. | 250—209 X |
| 2,719,235 | 9/55 | Emerson | 250—219 |
| 2,812,447 | 11/57 | MacMartin et al. | 250—219 |
| 2,961,547 | 11/60 | Snavely | 250—219 |
| 3,026,415 | 3/62 | Lake et al. | 250—209 |
| 3,061,731 | 10/62 | Their et al. | 250—219 |

RALPH G. NILSON, *Primary Examiner.*

ARCHIE R. BORCHELT, *Examiner.*